(12) United States Patent
Sargent et al.

(10) Patent No.: US 10,899,440 B2
(45) Date of Patent: Jan. 26, 2021

(54) ROTOR BLADE TIP DESIGN FOR IMPROVED HOVER AND CRUISE PERFORMANCE

(71) Applicants: Sikorsky Aircraft Corporation, Stratford, CT (US); United Technologies Corporation, Farmington, CT (US)

(72) Inventors: Daniel Caleb Sargent, Easton, CT (US); Timothy James Conti, Shelton, CT (US); Brian E. Wake, South Glastonbury, CT (US); Byung-Young Min, Glastonbury, CT (US); Blake Almy Moffitt, South Windsor, CT (US); Joseph Pantalone, III, Guilford, CT (US)

(73) Assignees: SIKORSKY AIRCRAFT CORPORATION, Stratford, CT (US); UNITED TECHNOLOGIES CORPORATION, Farmington, CT (US)

( * ) Notice: Subject to any disclaimer, the term of this patent is extended or adjusted under 35 U.S.C. 154(b) by 209 days.

(21) Appl. No.: 15/916,994

(22) Filed: Mar. 9, 2018

(65) Prior Publication Data

US 2018/0257768 A1 Sep. 13, 2018

Related U.S. Application Data

(60) Provisional application No. 62/469,103, filed on Mar. 9, 2017.

(51) Int. Cl.
*B64C 27/46* (2006.01)

(52) U.S. Cl.
CPC .................. *B64C 27/463* (2013.01)

(58) Field of Classification Search
USPC .......................................... 416/238
See application file for complete search history.

(56) References Cited

U.S. PATENT DOCUMENTS

| | | | |
|---|---|---|---|
| 4,324,530 A | | 4/1982 | Fradenburgh et al. |
| 4,334,828 A | | 6/1982 | Moffitt |
| 4,451,206 A | | 5/1984 | Philippe et al. |
| 4,880,355 A | * | 11/1989 | Vuillet .................. B64C 27/463 |
| | | | 416/228 |
| 5,199,851 A | * | 4/1993 | Perry ...................... B64C 23/06 |
| | | | 416/223 R |
| 5,320,494 A | * | 6/1994 | Reinfelder ............ B64C 27/463 |
| | | | 156/701 |

(Continued)

FOREIGN PATENT DOCUMENTS

EP 0351104 B1 1/1990

OTHER PUBLICATIONS

Brocklehurst et al., "A Review of Helicopter Rotor Blade Tip Shapes," p. 35-74, Aug. 29, 2012, Progress in Aerospace Sciences, available at www.elesevier.com.†

*Primary Examiner* — Aaron R Eastman
(74) *Attorney, Agent, or Firm* — Foley & Lardner LLP

(57) ABSTRACT

A rotor blade for a rotary wing aircraft and a tip for the rotor blade. The rotor blade includes a blade root, a blade tip and a blade body that extends from the blade root to the blade tip. The blade tip includes: a continuously swept leading edge, a compound trailing edge, and a continuous anhedral.

15 Claims, 5 Drawing Sheets

(56) References Cited

U.S. PATENT DOCUMENTS

| | | | |
|---|---|---|---|
| 6,231,308 B1* | 5/2001 | Kondo | B64C 27/463 416/228 |
| 6,364,615 B1 | 4/2002 | Toulmay et al. | |
| 7,513,750 B2 | 4/2009 | Moffitt et al. | |
| 8,066,219 B2 | 11/2011 | Patt et al. | |
| 8,128,376 B2* | 3/2012 | Karem | B64C 27/467 416/228 |
| 8,172,540 B2 | 5/2012 | Owen | |
| 9,085,359 B2 † | 7/2015 | Brocklehurst | |
| 2005/0281676 A1* | 12/2005 | Egolf | B64C 27/463 416/228 |
| 2011/0236208 A1* | 9/2011 | Hirsch | B64C 27/46 416/23 |
| 2012/0251326 A1* | 10/2012 | Schimke | B64C 27/463 416/210 R |
| 2017/0174339 A1* | 6/2017 | Leusink | B64C 27/04 |

\* cited by examiner
† cited by third party

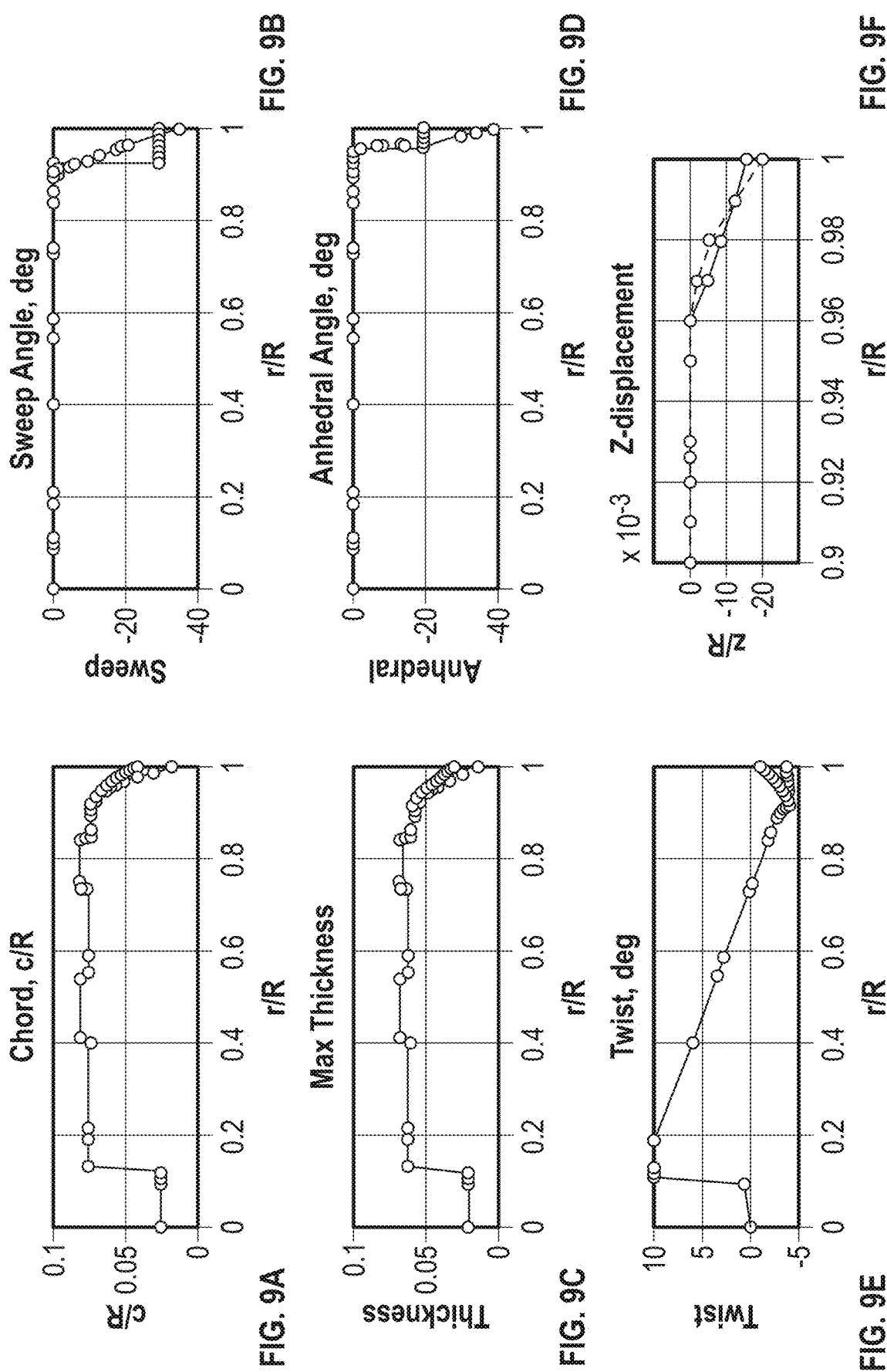

ROTOR BLADE TIP DESIGN FOR IMPROVED HOVER AND CRUISE PERFORMANCE

CROSS-REFERENCE TO RELATED APPLICATIONS

This application claims the benefit of U.S. provisional patent application Ser. No. 62/469,103 filed Mar. 9, 2017, the entire contents of which are incorporated herein by reference.

BACKGROUND OF THE INVENTION

The present invention is directed to a rotor blade for a rotary wing aircraft and, in particular, to a blade tip design for a rotor blade for a rotary wing aircraft that improves hover performance by the combined tailoring of airfoil, continuous blade tip sweep, continuous blade tip taper and continuous blade tip anhedral.

Rotary wing aircraft such as helicopters include a main rotor assembly having a rotor and rotor blades that sits atop a fuselage of the aircraft. The payload, range and airspeed capabilities of the aircraft are limited by a number of factors, one of which is the efficiency of the main rotor assembly, that is, the power required to produce a given thrust. Technologies developed to improve the operational capabilities of helicopters often come with some level of performance degradation in the form of, for example, increased weight, increased drag, and/or increased fuel burn or other flight inefficiencies. Accordingly, it is desirable to provide an improved rotor blade with increased efficiency to offset these other losses.

SUMMARY OF THE INVENTION

According to one embodiment of the present invention, a rotor blade for a rotary wing aircraft, including: a blade root; a blade tip including: a continuously swept leading edge, a compound trailing edge, and a continuous anhedral; and a blade body that extends from the blade root to the blade tip.

According to another embodiment of the present invention, a tip of a rotor blade, the tip including: a continuously swept leading edge; a compound trailing edge; and a continuous anhedral, wherein a blade body extends from a blade root to the tip.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 9A-9F shows various blade parameters over the length of the exemplary rotor blade of FIG. 3.

DETAILED DESCRIPTION

Figure 1:
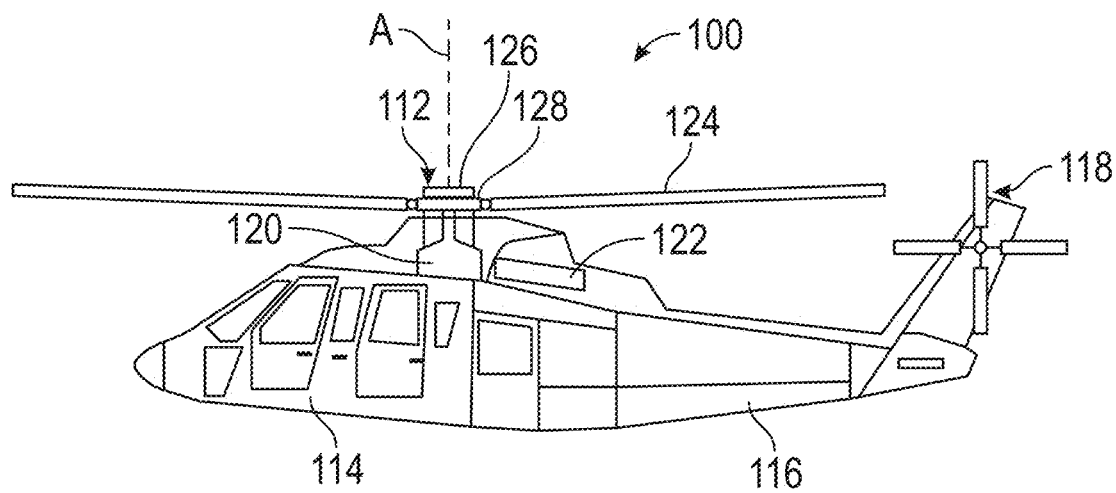
FIG. 1 schematically illustrates an exemplary rotary wing aircraft having a main rotor assembly.

Referring now to the Figures, where the invention will be described with reference to specific embodiments, without limiting same, FIG. 1 schematically illustrates a conventional rotary wing aircraft 100 having a main rotor assembly 112. The aircraft 100 includes an airframe 114 having an extending tail 116 which mounts an anti-torque system, such as a tail rotor assembly 118. The main rotor assembly 112 is driven about an axis of rotation A through a transmission (illustrated schematically at 120) by one or more engines 122. The main rotor assembly 112 includes a plurality of rotor blades 124 mounted to a rotor hub 126, and a swashplate 128 that is used to affect a state or orientation of the rotor blades 124. The rotor blades 124 can have a variable pitch that can be used to affect pitch and roll angles of the aircraft 100 as well as velocity of the aircraft 100. The pitch of the rotor blades 124 can be controlled by a collective control or by a cyclic control.

Figure 2:
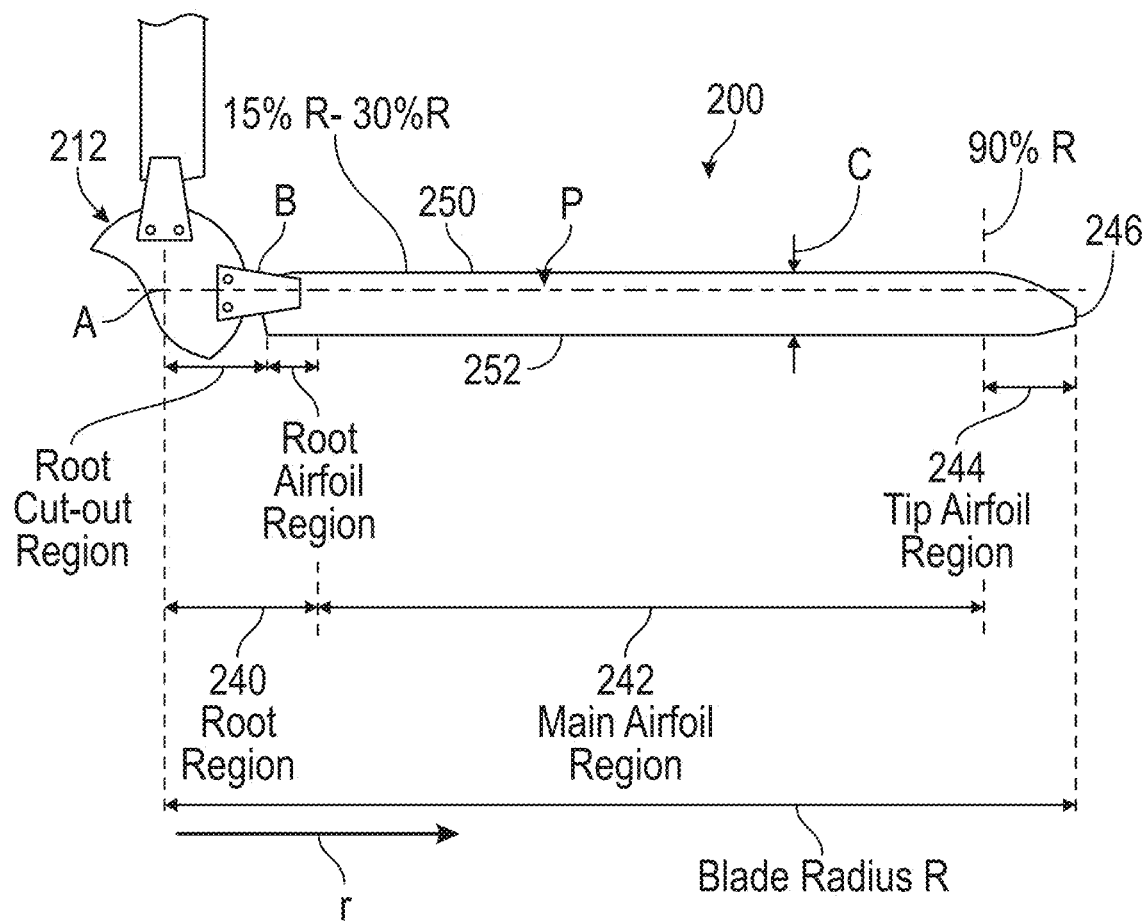
FIG. 2 shows a single main rotor system which may incorporate a tip planform designed according to the present invention.

FIG. 2 illustrates a general exemplary plan view of a main rotor blade 200. The rotor blade 200 can generally be divided into a root region 240, a main region 242, and a tip region 244. The root, main, and tip regions 240, 242, 244 define the span of the rotor blade 200 and define a blade radius R between the axis of rotation A and a distal tip end 246 of the blade tip region 244. The rotor blade 200 defines a leading edge 250 and a trailing edge 252, which define the chord C of the rotor blade 200. A pitching or feathering axis P is the axis about which aerodynamic blade twist occurs for the blade main region 242.

The blade region extending inboard of approximately r=0% R to 30% R, and preferably inboard of r=0% R to 15% R defines the root region 240 that includes the blade to hub attachment system (schematically illustrated), where r is a distance measured along the blade radius starting from the root cut-out region; and R is the length of the entire blade radius. (A radial location along the rotor blade may be specified herein either by expressing r as a percentage of R (e.g., r=30% R) or by expressing a ratio of r to R (e.g., r/R=0.30).) Notably, the rotor blade 200 is mounted within the root region 240 along a length typically referred to as a root cut-out region. The root cut-out region has comparatively minimal aerodynamic significance since it is typically at least partially enclosed within a blade cuff B (illustrated schematically). The blade cuff B mounts the rotor blade 200 to the rotor head assembly 212 as generally understood such that further detailed discussion need not be provided herein.

The main region 242 of the rotor blade 200 is the primary aerodynamic portion of the rotor blade 200 inclusive of the tip region 244. The tip region 244 is preferably the outboard 10% R of the rotor blade 200. It should be understood that the blade is illustrated somewhat schematically and that various chord distributions along the blade span will also be usable with the present invention.

The blade tip region 244 typically encompasses approximately r=90% R-100% R of the rotor blade 200. The tip region 244 may be defined by several design characteristics that differentiate it from the main region 242. For example, the tip region 244 can include a transition to transonic airfoils, changes in twist and the incorporation of other geometric characteristics such as sweep, taper, dihedral, and anhedral. It should also be understood that a multitude of airfoil sections may be utilized in any or all of the rotor blade regions as defined herein. The tip planform designed according to the present invention may be applied over the tip region 244 of the blade.

Figure 3:
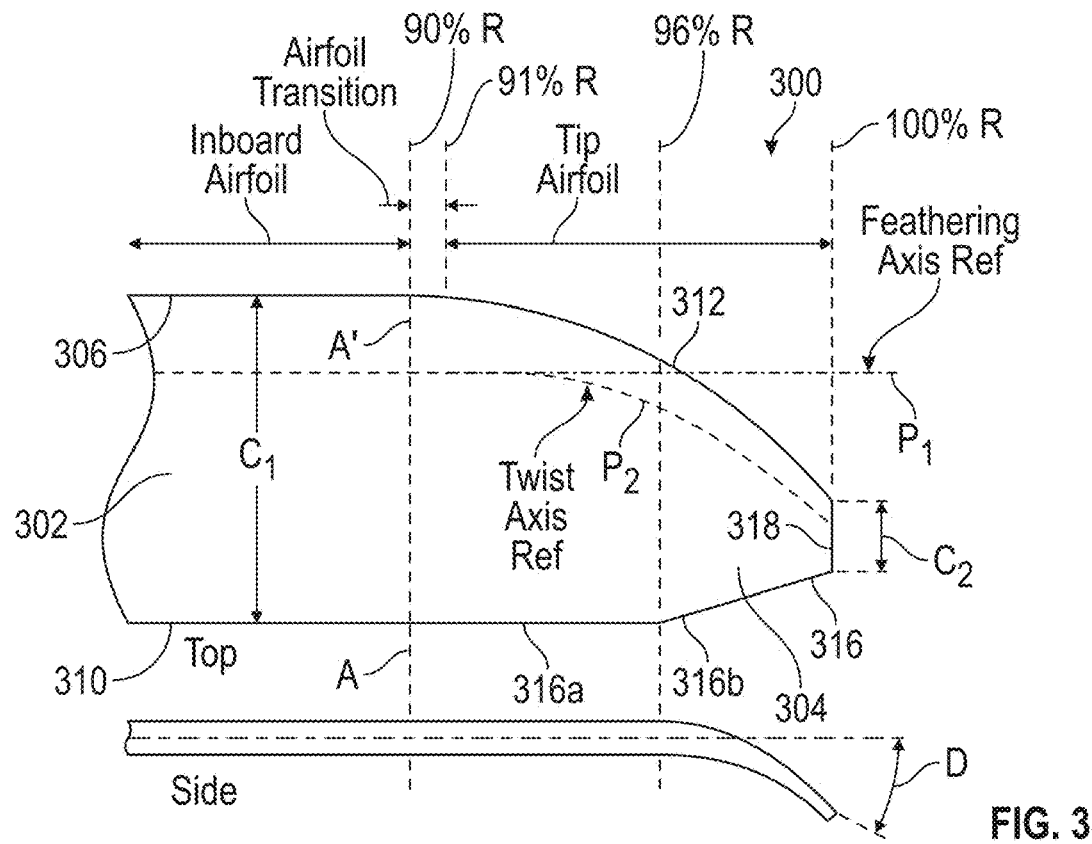
FIG. 3 shows a close-up top view of the tip of the rotor blade of FIG. 2 and a corresponding outline drawing in one embodiment.

FIG. 3 shows a close-up outline view of an untwisted tip 304 of rotor blade 300 in one embodiment. The leading edge 306 and trailing edge 310 of the body 302 of the rotor blade 300 are shown to the left of line A-A' and are parallel to a feathering axis $P_1$ of the rotor blade 300 along the body 302. Tip 304 includes a leading edge 312 which is a continuation of the leading edge 306 of the body 302 and a trailing edge 316 which is a continuation of the trailing edge 310 of the body 302. Leading edge 312 forms a continuously increasing sweep beginning at approximately at r=90% R and the trailing edge 316 forms a compound trailing edge 316 including first trailing edge 316a and second trailing edge 316b with the intersection of first trailing edge 316a and second trailing edge 316b occurring at a location outboard of the location of the beginning of the sweep of the leading edge 312. A region in which an edge has a continuous sweep means that the edge is continuous in both position and in slope over the region. Being continuous in position means that the y-value of the edge (i.e., distance from feathering axis $P_1$) at any selected value of r/R in the region is the same when the selected value of r/R is approached from a radial location greater than the selected value as when approached from a radial location less than the selected value. Similarly, being continuous in slope in the region means that the slope (i.e., the change in y-value with a change in r (or in r/R)) at any selected value of r/R in the region is the same when the selected value of r/R is approached from a radial location greater than the selected value as when approached from a radial location less than the selected value. In various embodiments, the first trailing edge 316a and second trailing edge 316b intersect at about r=96% R. The first trailing edge 316a is parallel to the feathering axis $P_1$, while second trailing edge 316b tapers forward toward the leading edge 312. The leading edge 312 and the second trailing edge 316b extend to the outermost edge 318 at r=100% R, defined by tip chord $C_2$ of the blade 300. In one embodiment, the outermost edge 318 is a flat edge perpendicular to the feathering axis $P_1$ and has a taper ratio relative to the chord $C_1$ inboard of A-A' of 0.24.

The cross-section of the tip 304 is defined by the airfoils that include a transition from the inboard airfoil spanning from about r=90% R to about r=91% R, and a tip airfoil that spans from about r=91% R to r=100% R. The twist angle of the tip 404 is defined as a rotation about an axis centered on the twist reference axis P2 and parallel to the feathering axis $P_1$.

The tip 304 of the rotor blade 300 forms an anhedral by having the surface of the tip 304 curve continuously away from and below a plane defined by the body 302 of the rotor blade 300 (i.e., in a direction opposite the direction of the lift generated by the rotor blade 300). The anhedral begins at about r/R=0.96 and the angle D is measured between a line that passes through r/R=0.96 and edge 318 and a line, such as feathering axis $P_1$, in a horizontal plane of the rotor blade. In various embodiments, the angle of the anhedral D grows from 0 degrees at r/R=0.96 to an angle that is from about −20 degrees to about −40 degrees at the edge 318.

Figure 4:
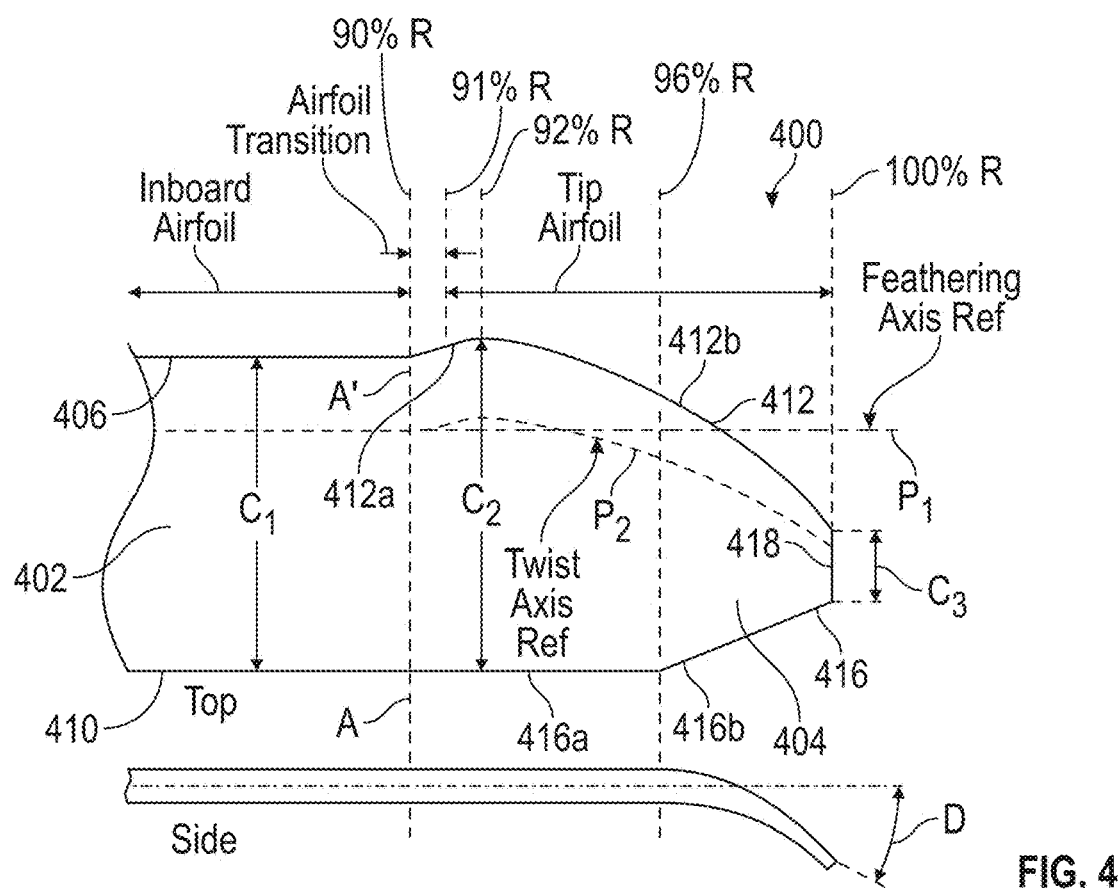
FIG. 4 shows a top view of a tip of the rotor blade of FIG. 2 and a corresponding side view in another embodiment.

FIG. 4 shows a top view of the untwisted tip 404 of a rotor blade 400 and a corresponding side view in another embodiment. In various embodiments the rotor blade 400 is a replacement for a conventional wide chord blade (WCB). The body 402 of the rotor blade 400 includes a leading edge 406 and a trailing edge 410, both of which are parallel to a feathering axis $P_1$ of the rotor blade 400 along the main body 402. The tip 404 of the rotor blade 400 includes the outer-most 10% of the rotor blade 400. Line A-A' demarcates the tip 404 of the rotor blade 400 from the body 402 of the rotor blade 400.

At the tip 404, the leading edge 412 forms a compound edge with a first leading edge 412a that protrudes ahead of the leading edge 406 of the main body 402 between approximately r/R=0.90 and r/R=0.92 and a second leading edge 412b that sweeps backward continuously (i.e., continuous in both y-value and slope value) beginning approximately at r/R=0.92. Also at the tip, the trailing edge 416 forms a compound trailing edge 416 including a first trailing edge 416a and a second trailing edge 416b, with the intersection of first trailing edge 416a and second trailing edge 416b occurring at a location outboard of the location of the beginning of the sweep of the leading edge 412b. In various embodiments, the first trailing edge 416a and second trailing edge 416b intersect at about r/R=0.96. The first trailing edge 416a is parallel to the feathering axis $P_1$ and the main body trailing edge 410, while the second trailing edge 416b tapers forward. The continuously swept leading edge 412b and the second trailing edge 416b extend to the outermost edge 418 of the blade 400, defined by chord length $C_3$, which is perpendicular to the feathering axis 408. In one embodiment, the outermost edge 418 is perpendicular to the feathering axis 408 and has a taper ratio relative to the inboard chord $C_1$ inboard of A-A' of 0.25 and a taper ratio relative to the protrusion chord $C_2$ of 0.24.

The cross-section of the tip 404 is defined by the airfoils that include a transition from the inboard airfoil spanning from about 90% to about 91% R, and a tip airfoil that spans from approximately 92% R to 100% R. The twist angle of the tip 404 is defined as a rotation about an axis centered on the twist reference axis $P_2$ and parallel to the feathering axis $P_1$. The tip 404 of the rotor blade 400 forms an anhedral by having the surface of the tip 404 curve continuously away from and below a plane defined by the body 402 of the rotor blade 400. The anhedral curve begins at approximately r/R=0.96 and the angle of the anhedral D is between a line passing through r/R=0.96 and edge 418 and a line, such as feathering axis $P_1$, in a horizontal plane of the rotor blade. In various embodiments, the angle of the anhedral D measures from about −20 degrees to about −25 degrees at edge 418.

Figure 5:
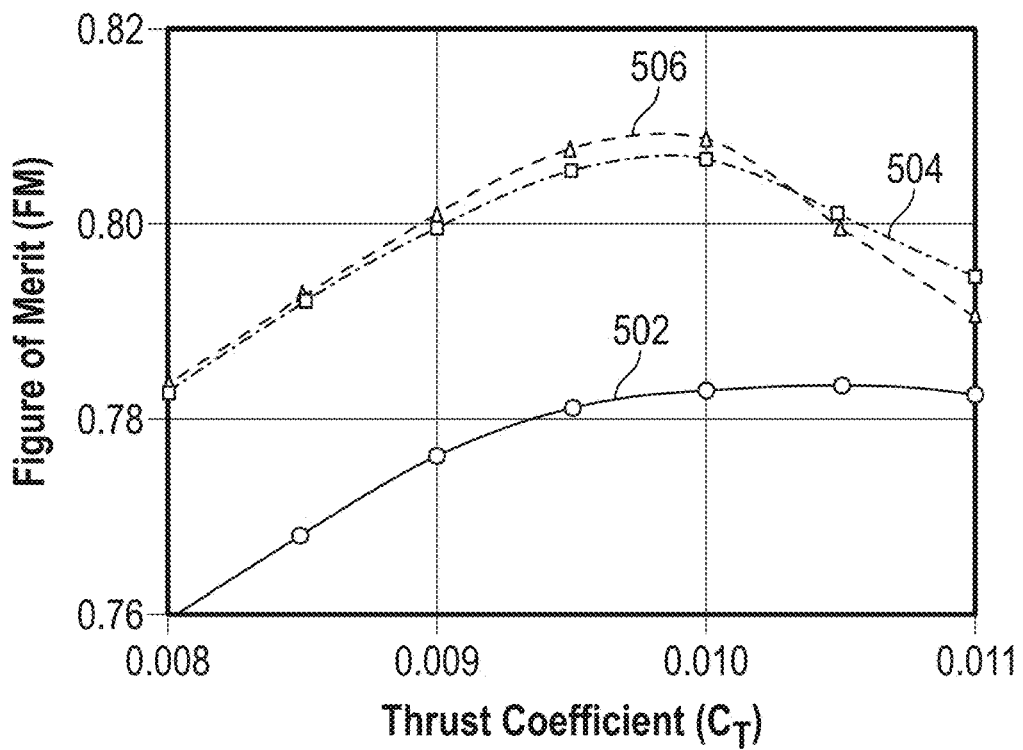
FIG. 5 shows simulations of hover efficiency for rotor blades having the tips shown in FIGS. 3 and 4 to the hover efficiency of a conventional wide chord blade.

FIG. 5 shows simulations comparing hover efficiency for rotor blades having the tips shown in FIGS. 3 and 4 to the hover efficiency of a conventional WCB. Thrust coefficient (CT) values are shown along the x-axis and hover efficiency (Figure of Merit (FM)) is shown along the y-axis. The hover efficiency for a conventional WCB (shown as curve 502) rises with thrust coefficient until it levels off to a hover efficiency of about 0.783 for thrust coefficient values above about 0.010. Curve 504 (representing the hover efficiency for the blade tip of FIG. 3) and Curve 506 (representing the hover efficiency for the blade tip of FIG. 4) are greater than curve 502 for all shown values of thrust coefficient, indicating that the tip design improves the hover efficiency of blades having blade tips 300 and 400 over a conventional WCB. In various embodiments, the blade tips 300 and 400 shown herein provide an additional 300-500 additional pound of hover lift relative to the WCB. The curves 504 and 506 reach a maximal hover efficiency between about 0.805 and 0.81, respectively, at a thrust coefficient of about 0.0098.

Figure 6:
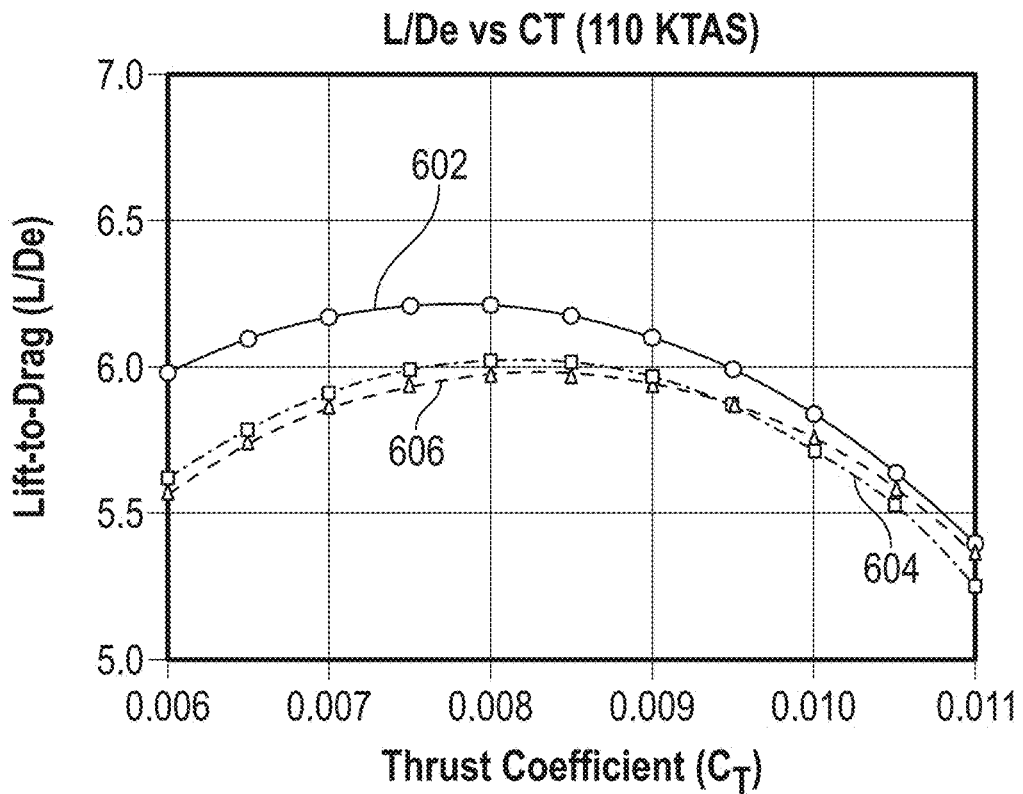
FIG. 6 shows simulations comparing the cruise performance (i.e., lift-to-drag ratio (L/De)) to thrust coefficient CT for rotor blades having the tips shown in FIGS. 3 and 4 and for a conventional wide chord blade.

FIG. 6 shows simulations comparing cruise performance (L/De) for rotor blades having the tips shown in FIGS. 3 and 4 (curves 604 and 606, respectively) to the cruise performance of a conventional WCB (curve 602). Thrust coefficient (CT) values are shown along the x-axis and the equivalent lift-to-drag ratio (L/De) is shown along the y-axis. The equivalent lift-to-drag is defined as the ratio between rotor lift and equivalent rotor drag (power/velocity minus the rotor propulsive force). Although cruise performance for blades having the blade tips 300 and 400 discussed herein is slightly less than the cruise performance for a conventional WCB having a square tip for thrust coefficient in the range of 0.0060 and 0.0110, the cruise performances approach each other at the high values of this range, where rotors often operate.

Figure 7:
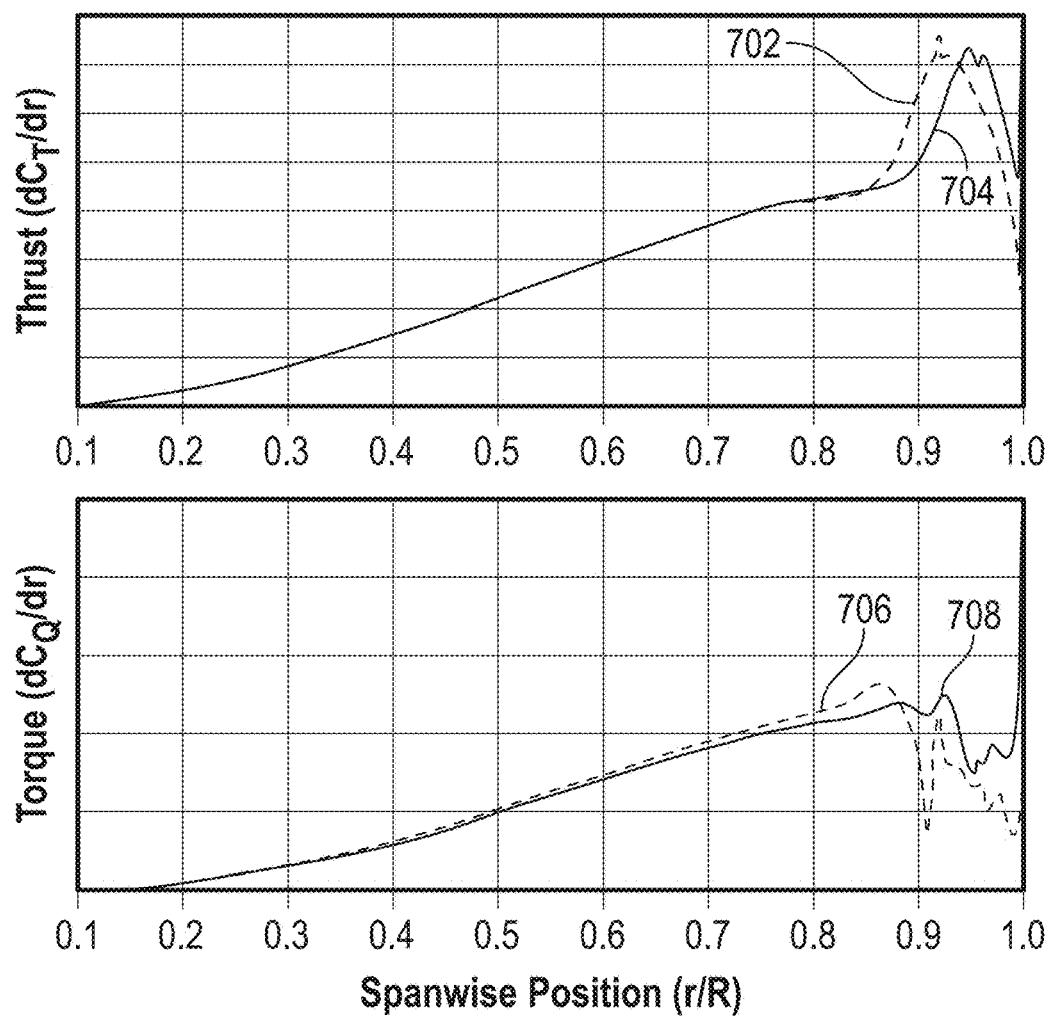
FIG. 7 shows simulations of spanwise thrust coefficient ($dC_T/dr$) and torque coefficient ($dC_Q/dr$) for a conventional wide chord blade and a rotor blade having the tips shown in FIGS. 3 and 4, for a high thrust hover condition.

FIG. 7 shows spanwise distributions of incremental thrust ($dC_T/dr$) and torque ($dC_Q/dr$) for a hovering rotor predicted using simulations for the rotor blade having the tip shown in FIG. 4 (curves 702 and 706) and a conventional WCB having swept, tapered, compound anhedral tip (curves 704 and 708). Spanwise position (r/R) is shown along the x-axis and the incremental thrust ($dC_T/dr$) and torque ($dC_Q/dr$) are shown along the y-axis. The rotor blade having the tip shown in FIG. 4 results in movement of the peak thrust of curve 702 inboard of that indicated by curve 704 for the conventional WCB. This off-loading of the tip results in a reduction in torque 706 for the tip shown in FIG. 4 relative to the torque 708 of the conventional WCB. This yields a rotor with higher hover efficiency (FM).

Figure 8:
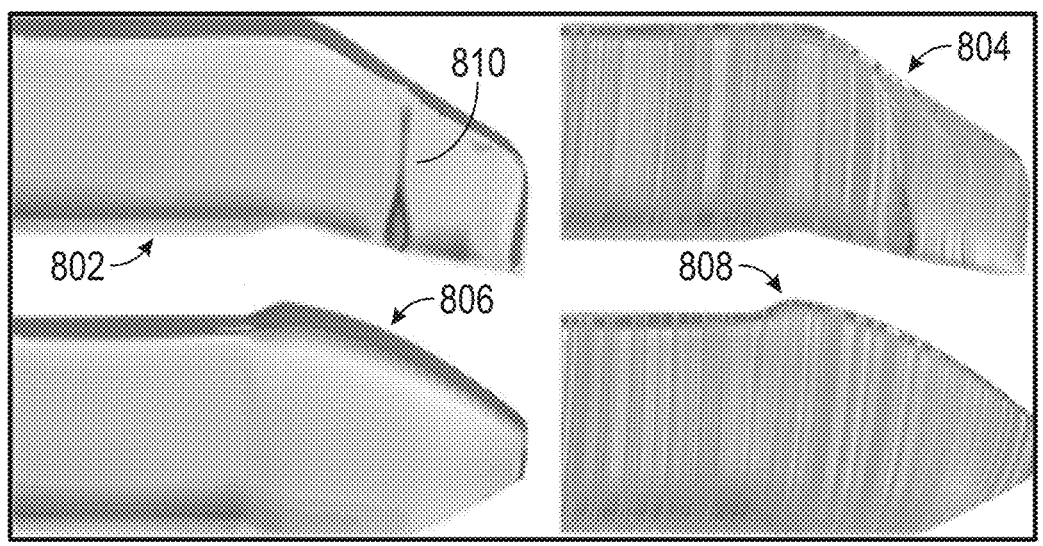
FIG. 8 shows simulations of surface shear stress and streamlines for a conventional wide chord blade and a rotor blade having a tip shown in FIG. 4, for a high thrust hover condition.

FIG. 8 shows simulations of contours of wall shear stress and surface streamlines for the conventional WCB (802 and 804 respectively) and for a rotor blade with the tip shown in FIGS. 4 (806 and 808 respectively) at a high thrust hover condition. For the conventional WCB there are relatively large regions of low shear stress 810 that indicate flow separation and/or shock formation. This same effect is seen in the streamline 804. For the tip shown in FIGS. 4 (806 and 808), indications of flow separation are not yet present, indicating again that the tip is less highly loaded and further from stall.

FIGS. 9A-9F show various parameters over the lengths of the exemplary rotor blade 300 of FIG. 3. FIG. 9A shows a chord to length ratio (c/R) against blade position, where c is the chord or perpendicular distance between the leading edge 306 and the trailing edge 310. The chord/length ratio is discontinuous over the body 302 of the rotor blade 300 (e.g., at r/R=0.4, 0.55, 0.75 and 0.85) due to a compound trailing edge 310. At the tip 304 (i.e., for r/R>0.90), the chord/length ratio c/R decreases due to the continuously swept leading edge 312 and the compound trailing edge 316.

FIG. 9B shows a sweep angle of the leading edge 312 of the rotor blade 300 with respect to blade position. The sweep angle is zero degrees over the body 302 of the rotor blade 300. At the tip 304 (i.e., for r/R>0.90), the sweep angle decreases from zero degrees to about −40 degrees at the edge 318 of the rotor blade 300.

FIG. 9C shows a maximum thickness of the rotor blade 300 with respect to blade position. At the tip 304 of the rotor blade, the blade thickness decreases from about 0.05 meters at r/R=0.9 to about 0.02 meters at r/R=1.0. FIG. 9D shows an anhedral angle of the rotor blade 300 with respect to blade position. The anhedral begins at about r/R=0.96. The anhedral angle varies linearly from zero degrees at r/R=0.96 to about −40 degrees at r/R=1.0.

FIG. 9E shows a twist angle of the blade with respect to blade position. The twist angle is an angle with respect to the feathering axis. The body of the blade has a twist angle of about 10 degrees between r/R=0.1 and r/R=0.2. The twist angle decreases linearly for r/R>0.2. In one embodiment, the twist angle is unchanged at the tip. (i.e., for 0.9<=r/R<=1.0). In another embodiment, the twist angle increases from r/R=0.9 to r/R=1.0.

FIG. 9F shows a vertical displacement of the rotor blade 300 with respect to blade position. FIG. 9F shows only the tip 304. The vertical displacement of the tip is zero in a range from about r/R=0.90 to about r/R=0.96. At distances greater than r/R=0.96, the vertical displacement gradually drops from z/R=0 to about z/R=−20. The shape formed by the z-displacement is a continuous curve without a discontinuity in slope at z/R=0.96.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A rotor blade for a rotary wing aircraft, comprising:
   a blade root;
   a blade tip; and
   a blade body that extends from the blade root to the blade tip, the blade body defining a feathering axis;
   wherein the blade tip comprises a continuously swept leading edge, a compound trailing edge, and a continuous anhedral, the compound trailing edge including a first trailing edge and a second trailing edge outboard of the first trailing edge and forming an intersection with the first trailing edge, the first trailing edge being parallel to a feathering axis of the blade and the second trailing edge tapering forward and extending to an outermost edge of the blade tip.

2. The rotor blade of claim 1, wherein the anhedral of the rotor blade begins at r/R=0.96 and the anhedral angle at the tip edge is between about −20 degrees and −40 degrees, where R is a length of the rotor blade from root to tip and r is a length measured from the root of the rotor blade.

3. The rotor blade of claim 1, wherein the first trailing edge extends from r/R=0.90 to r/R=0.96, and the second trailing edge tapers forward from r/R=0.96 to r/R=1, where R is a length of the rotor blade from root to tip and r is a length measured from the blade root.

4. The rotor blade of claim 1, wherein the leading edge sweeps backward continuously beginning at r/R=0.90.

5. The rotor blade of claim 1, wherein the leading edge further comprises a first leading edge that tapers forward away from the feathering axis between about r/R=0.91 and r/R=0.92 and a second leading edge that sweeps backward towards the feathering axis continuously for locations greater than r/R=0.92.

6. The rotor blade of claim 1, wherein the outermost edge of the tip is a flat edge perpendicular to the feathering axis of the body of the rotor blade.

7. The rotor blade of claim 1, wherein the tip of the blade further includes a twist angle of the blade with respect to the feathering axis.

8. A rotary wing aircraft that includes the rotor blade of claim 1.

9. A tip of a rotor blade, the tip comprising:
a continuously swept leading edge;
a compound trailing edge including a first trailing edge and a second trailing edge outboard of the first trailing edge and forming an intersection with the first trailing edge, the first trailing edge being parallel to a feathering axis of the rotor blade and the second trailing edge tapering forward and extending to an outermost edge of the tip; and
a continuous anhedral, wherein a blade body extends from a blade root to the tip.

10. The tip of claim 9, wherein the anhedral begins at r/R=0.96, where R is a length of the rotor blade from root to tip and r is a length measured from the root of the rotor blade.

11. The tip of claim 9, wherein the anhedral angle at the tip edge is in a range between about −20 degrees to about −40 degrees.

12. The tip of claim 9, wherein the first trailing edge extends from r/R=0.90 to r/R=0.96 and the second trailing edge tapers forward from r/R=0.96 to r/R=1, where R is a length of the rotor blade from root to tip and r is a length measured from the root of the rotor blade.

13. The tip of claim 9, wherein the leading edge sweeps backward continuously beginning at r/R=0.90.

14. The tip of claim 9, wherein the continuously swept leading edge further comprises a first leading edge that tapers forward between about r/R=0.91 and r/R=0.92 and a second leading edge that sweeps backward continuously for locations greater than r/R=0.92.

15. The tip of claim 9, wherein the outermost edge of the tip is a flat edge perpendicular to the feathering axis of the body of the rotor blade.

* * * * *